July 4, 1944. C. BEUTEL 2,352,597
APPARATUS FOR MUSICAL INSTRUCTIONS
Filed Nov. 6, 1941 2 Sheets-Sheet 1
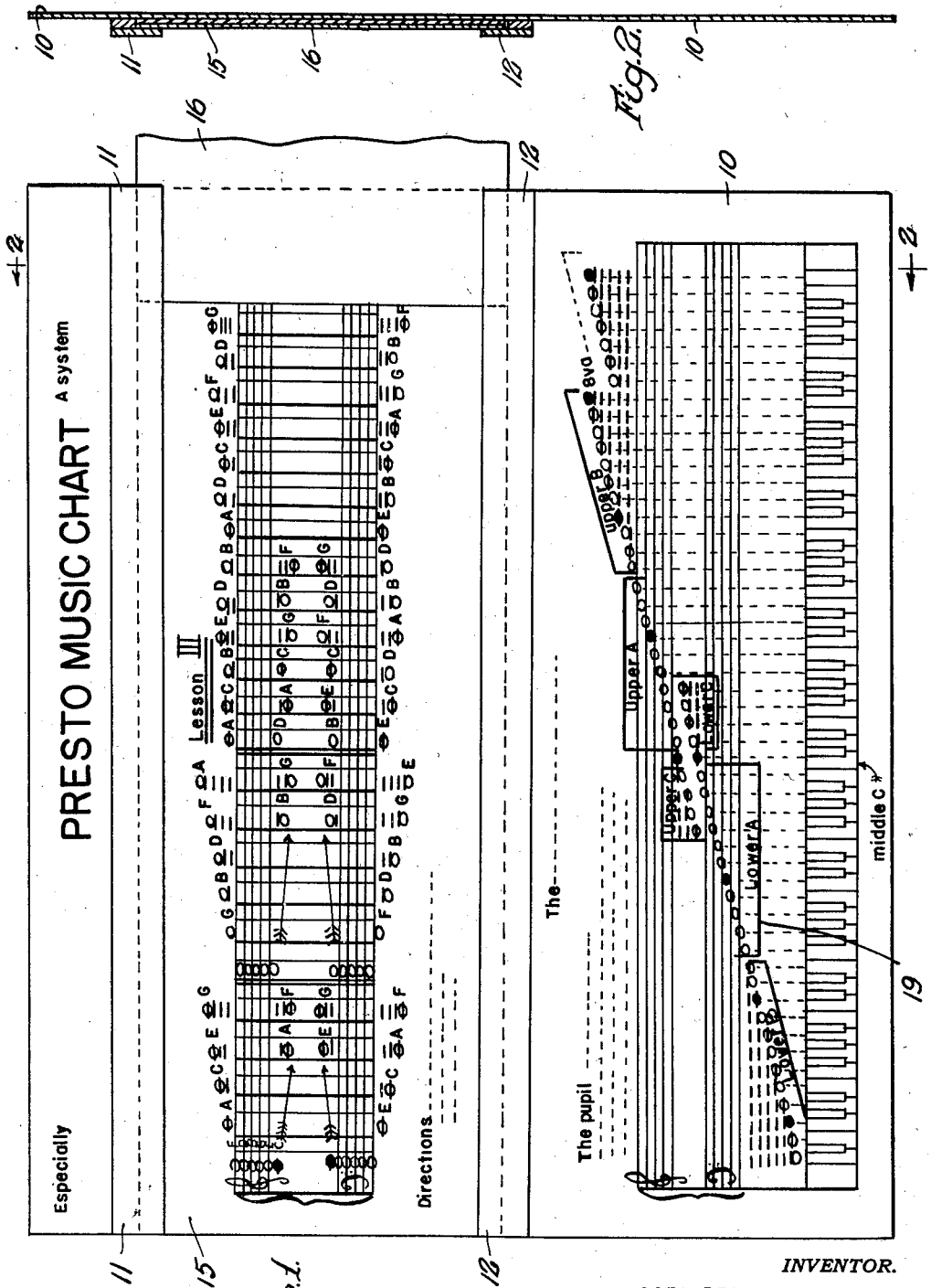
INVENTOR.
CARL BEUTEL
BY
ATTORNEYS

INVENTOR.
CARL BEUTEL
ATTORNEYS

Patented July 4, 1944

2,352,597

UNITED STATES PATENT OFFICE 2,352,597

APPARATUS FOR MUSICAL INSTRUCTION

Carl Beutel, Detroit, Mich.

Application November 6, 1941, Serial No. 418,021

2 Claims. (Cl. 84—480)

This invention relates to devices for the instruction of students of music, having as its principal object the provision of improved means for insuring the proper learning and memorizing of the locations and designations of the notes of the musical scales, and of the corresponding keys of a piano or other instrument.

It is also an object to provide means for facilitating the learning of the relationship between the notes of the grand staff and the standard keyboard, the relationship between the corresponding notes of the successive tetrachords of which the scale is composed, the relationship between the sharps and flats of the various notes, and to assist in the study of intervals.

Still another object is to provide such an apparatus which is usable by a student alone, without the constant attendance of a teacher (although the periodic supervision of a teacher is important), and from which the student can derive the necessary knowledge and training in a form most conducive to thorough learning of the material, and in a form, further, which is calculated to develop true mastery of the art of sight reading of music as distinguished from the mere memorizing or learning by rote of particular pieces of music.

Other objects and advantages will readily be apparent to those skilled in the art from the following description, wherein reference is made to the accompanying drawings illustrating a preferred embodiment of my invention and wherein similar reference numerals designate similar parts throughout the several views.

In the drawings:

Figure 1 is an elevational view of a combined lesson chart and slide support incorporating the principles of the present invention, also showing a lesson slide mounted therein and the masking slide which is used cooperatively therewith in the operation of the device.

Figure 2 is a vertical cross section taken substantially on the line 2—2 of Figure 1 and looking in the direction of the arrows.

Figure 3:
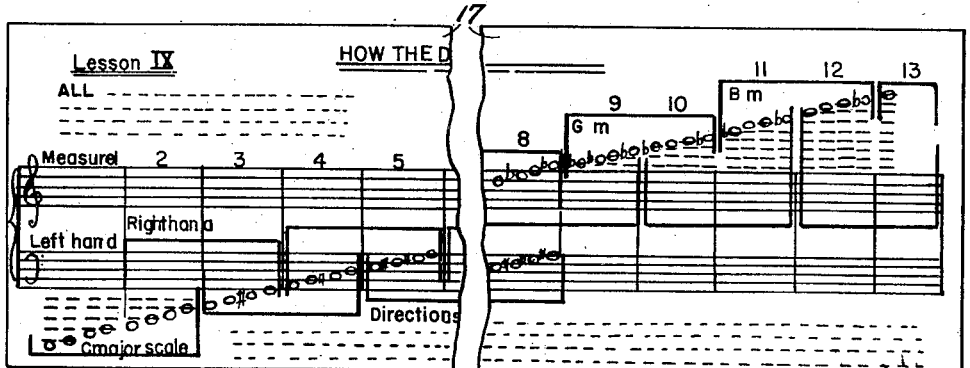
Figure 3 is an elevational view of a lesson slide adapted to be substituted for the lesson slide shown installed in the slide support in Figures 1 and 2.

Referring now to the drawings:

Reference character 10 designates a relatively stiff backing or support element, which may be of cardboard, plastic, or other suitable substance, and which is adapted to be stood in a music rack or other suitable support, as for example on the piano or other instrument.

Extending transversely near the top of the chart are a pair of gibs 11, 12 adapted to support slides, as 15, 16, 17, 18, 19, freely slidable therein. Upon one or more of the slides, as 15, may be inscribed the bass and treble clefs, and a plurality of notes, arranged in such order that the successive reading thereof will test the knowledge of the pupil and require him to recognize the notes without regard to their context. The notes are spaced more widely along the scale than in ordinary music, and just to the right of each note its designation is given.

The masking slide 16 is adapted to be placed in the gibs over, i. e. forwardly of, the lesson slide, and to cover the designations of the notes until the pupil has identified each. The masking slide is thus moved from left to right, after identification of each note, sufficiently to uncover the next note but not its designation. A plurality of progressively more difficult lesson slides are provided, and each is used in the same manner to thoroughly develop the pupil's ability to identify all of the notes.

On the lower half of the chart as illustration is provided showing the relationship between the grand staff and the standard piano keyboard. In conjunction with this a special lesson slide 17 (Figure 3) is provided, containing notes arbitrarily arranged for drill purposes, as indicated at 18. The designation to the right of each such note, instead of the identifying the note itself, indicates the section of the keyboard in which the note is located (upper A, lower B, etc.), the various sections of the keyboard being similarly designated on the diagram 19 on the lower half of the chart. The student is thus assisted in learning the locations of the notes on the keyboard, and by progressively moving the masking slide in the same manner, he may require himself to learn and locate the keys on the keyboard in this manner, and check his correctness after making the locations. It will further be seen that by playing each of the notes he may associate the sound with the designation and position of each.

Figure 4:
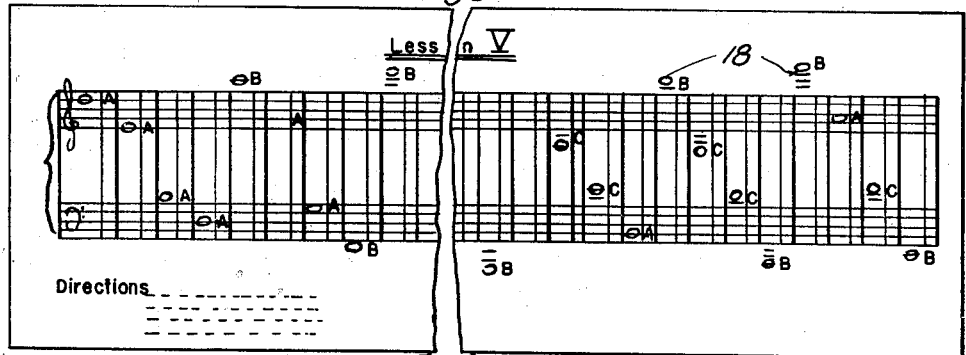
Figures 4 and 5 are views similar to Figure 3 showing other lesson slides.

Figure 4 illustrates another lesson slide 18 adapted to replace the lesson slide 15 of Figures 1 and 2, and which is provided with note designations given in tabular form, without the use of a scale to indicate their relative placement thereupon, and accordingly rendering it impossible for the student to judge the note except by its designation. The tabular arrangement also requires the pupil to identify the relationship between those notes of the scales which are spaced by full steps and half steps from one another. In each case the problem presented to the student is at the left and its answer at the right, in such manner that by movement of the masking slide to the right the correctness of the answer of the student may be checked.

Figure 5:
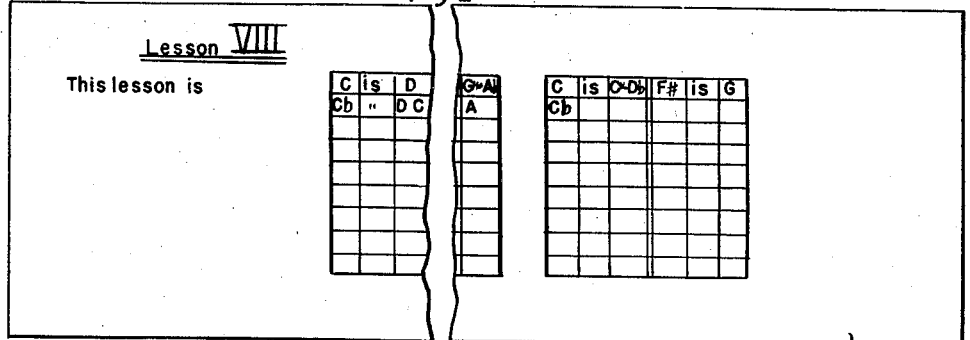
Figure 6:
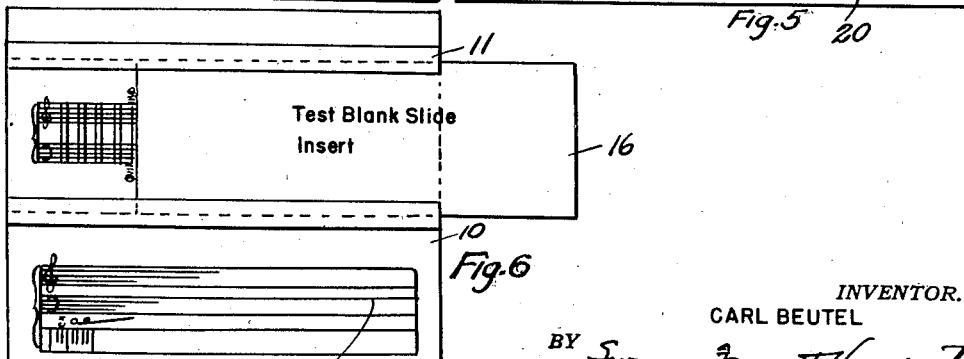
Fig. 6 is a front elevation of my improved chart and slide support with a blank masking slide partially inserted to cover a lesson to be used in a test.

In Figure 5 still another lesson slide 20 is illustrated, showing the relationship between the diatonic scales and the Greek tetrachord, and arranged to teach the student the relationship which exists between the notes by reason of the repetition of the tetrachord throughout the diatonic scales.

It will be recognized by those skilled in this field that with the aid of my improved teaching device proper and continued drilling in sight reading of music may be conducted in such manner as to insure against harmful memorizing by rote, and to develop to the fullest extent the ability to read music at sight by rapid identification of the notes, without regard to context or memory.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A music teaching device comprising a backing member having a representation of a substantially complete piano keyboard divided into marked component sections a pair of forwardly extending generally horizontal and parallel slideways extending forwardly from the backing member above said marked keyboard representation, a lesson element removably mounted in the slideways across the keyboard representation and provided with successively arranged note symbols, and with the proper designation of each note symbol inscribed to the right of each such symbol, and between such symbol and the next succeeding symbol, and an opaque masking slide slidably mounted in said slideways forwardly of the lesson element to conceal a desired portion of the latter, the masking slide being movable to the right to progressively reveal to view first each of the note symbols and later the designations thereof.

2. A music teaching device comprising a support having a pair of forwardly extending generally horizontal and parallel slideways thereupon, a lesson element removably mounted in the slideways forwardly of said support and provided with successively arranged note symbols, and also provided, to the right of each such symbol and between such symbol and the next succeeding symbol, with a designation as to the portion of an instrument keyboard in which a piano key corresponding thereto is to be found, means also carried by said support and provided with a representation of a substantially complete piano keyboard, and with corresponding designations of the sections of said keyboard, and an opaque masking slide mounted in said slideways forwardly of the lesson element to conceal a desired portion of the latter, the masking slide being movable to the right to progressively reveal to view the note symbols and the appurtenant keyboard designations.

CARL BEUTEL.